US012326520B2

(12) United States Patent
Wang et al.

(10) Patent No.: US 12,326,520 B2
(45) Date of Patent: Jun. 10, 2025

(54) SCANNING FIBER TRANSMITTER FOR DISTANCE DETECTION

(71) Applicant: Beijing Voyager Technology Co., Ltd., Beijing (CN)

(72) Inventors: Chao Wang, Mountain View, CA (US); Wenbin Zhu, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 1049 days.

(21) Appl. No.: 17/192,714

(22) Filed: Mar. 4, 2021

(65) Prior Publication Data
US 2022/0283273 A1   Sep. 8, 2022

(51) Int. Cl.
G01S 7/481   (2006.01)
G01S 17/10   (2020.01)
G01S 17/931  (2020.01)

(52) U.S. Cl.
CPC .......... G01S 7/4818 (2013.01); G01S 7/4814 (2013.01); G01S 17/10 (2013.01); G01S 17/931 (2020.01)

(58) Field of Classification Search
None
See application file for complete search history.

(56) References Cited

U.S. PATENT DOCUMENTS

| | | | | |
|---|---|---|---|---|
| 7,608,842 B2* | 10/2009 | Johnston | ................. | G02B 26/10 385/147 |
| 7,616,986 B2* | 11/2009 | Seibel | .................. | A61B 5/0062 250/234 |
| 10,288,876 B2* | 5/2019 | Fujiwara | ................ | G02B 23/26 |
| 2004/0151466 A1 | 8/2004 | Crossman-Bosworth et al. | | |
| 2005/0018264 A1* | 1/2005 | Benedict | ................ | G02B 26/10 359/209.1 |
| 2005/0173817 A1 | 8/2005 | Fauver et al. | | |
| 2013/0044309 A1 | 2/2013 | Dakin et al. | | |

(Continued)

FOREIGN PATENT DOCUMENTS

KR       102057199 B1    12/2019
WO     2018055449 A2     3/2018

OTHER PUBLICATIONS

International Search Report and Written Opinion for PCT Application No. PCT/US2022/017565, Mailed on Jun. 16, 2022, 13 pages.

*Primary Examiner* — Yuqing Xiao
*Assistant Examiner* — Jempson Noel
(74) *Attorney, Agent, or Firm* — Kilpatrick Townsend & Stockton LLP

(57) ABSTRACT

Apparatus and methods for determining the distance to an object by detecting a reflected light beam. A light emitter emits a light beam. An optical fiber is mounted to direct the light beam as an output light beam of the optical fiber. An actuator is coupled proximate a distal end of the optical fiber, for moving the distal end of the optical fiber in a desired pattern. Collimation optics are mounted to intercept the output light beam of the optical fiber and collimate the output light beam of the optical fiber. A photodetector is mounted to receive a reflected light beam after reflecting off an object in an external environment. A control system determines a distance to the object based on an elapsed time between emission of the light beam and a detection of the reflected light beam by the photodetector.

20 Claims, 10 Drawing Sheets

(56) References Cited

U.S. PATENT DOCUMENTS

| | | |
|---|---|---|
| 2014/0231647 A1 | 8/2014 | Chinn et al. |
| 2015/0185313 A1* | 7/2015 | Zhu .................. G02B 26/105 |
| | | 359/200.7 |
| 2016/0291134 A1 | 10/2016 | Droz et al. |
| 2016/0324403 A1* | 11/2016 | Yeoh .................. H10N 30/802 |
| 2017/0097506 A1* | 4/2017 | Schowengerdt ..... G02B 6/0076 |
| 2017/0146641 A1 | 5/2017 | Walsh et al. |
| 2017/0208297 A1* | 7/2017 | Yeoh .................. H04N 9/3129 |
| 2018/0045816 A1 | 2/2018 | Jarosinski et al. |
| 2018/0095304 A1* | 4/2018 | Irish .......................... G01J 3/44 |
| 2018/0103834 A1 | 4/2018 | Yeoh et al. |
| 2018/0348440 A1 | 12/2018 | Zhang et al. |
| 2019/0227299 A1 | 7/2019 | Gmitro et al. |
| 2020/0049895 A1* | 2/2020 | Zhang .................. G02B 26/103 |
| 2020/0135802 A1 | 4/2020 | Rezk et al. |
| 2020/0310037 A1 | 10/2020 | Zhang et al. |
| 2020/0341124 A1 | 10/2020 | Yu et al. |

* cited by examiner

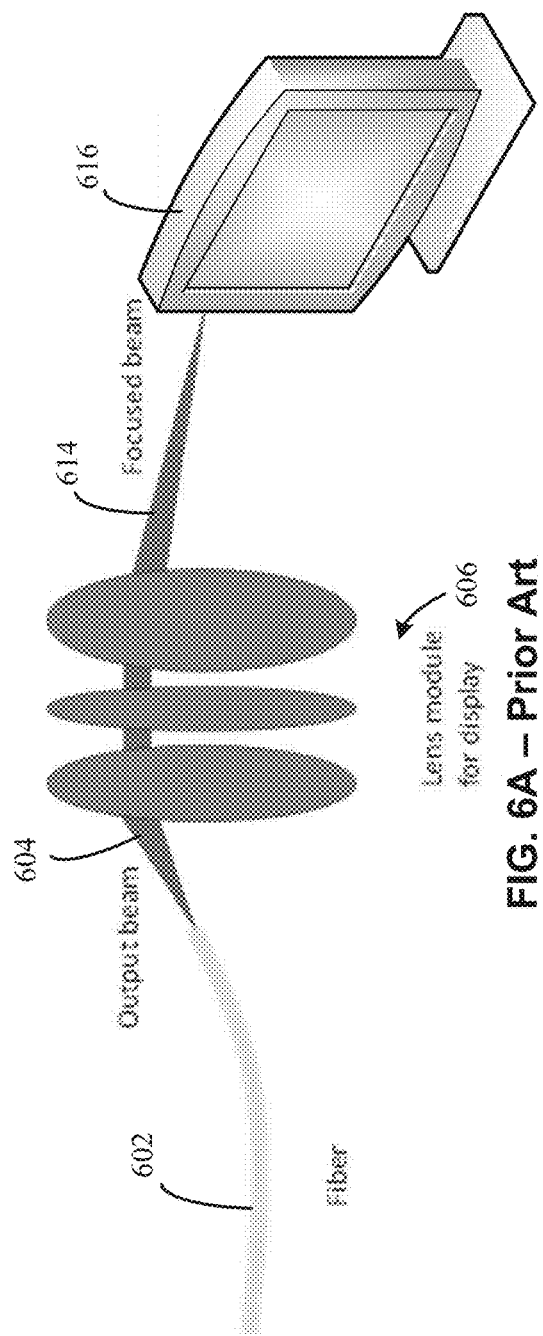
FIG. 6A – Prior Art
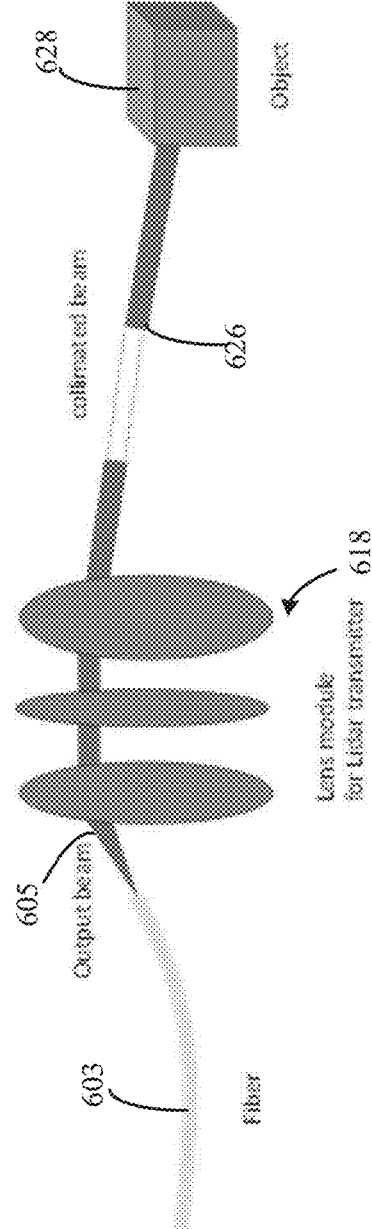
FIG. 6B – Prior Art

SCANNING FIBER TRANSMITTER FOR DISTANCE DETECTION

BACKGROUND OF THE INVENTION

Unless otherwise indicated herein, the materials described in this section are not prior art to the claims in this application and are not admitted to be prior art by inclusion in this section. In particular, disparate technologies are discussed that it would not be obvious to discuss together absent the teachings of the present invention.

Modern vehicles are often equipped with sensors designed to detect objects and landscape features around the vehicle in real-time to enable technologies such as lane change assistance, collision avoidance, and autonomous driving. Some commonly used sensors include image sensors (e.g., infrared or visible light cameras), acoustic sensors (e.g., ultrasonic parking sensors), radio detection and ranging (RADAR) sensors, magnetometers (e.g., passive sensing of large ferrous objects, such as trucks, cars, or rail cars), and light detection and ranging (LiDAR) sensors.

A LiDAR system typically uses a light source and a light detection system to estimate distances to environmental features (e.g., pedestrians, vehicles, structures, plants, etc.). For example, a LiDAR system may transmit a light beam (e.g., a pulsed laser beam) to illuminate a target and then measure the time it takes for the transmitted light beam to arrive at the target and then return to a receiver near the transmitter or at a known location. In some LiDAR systems, the light beam emitted by the light source may be steered across a two-dimensional or three-dimensional region of interest according to a scanning pattern, to generate a "point cloud" that includes a collection of data points corresponding to target points in the region of interest. The data points in the point cloud may be dynamically and continuously updated, and may be used to estimate, for example, a distance, dimension, location, and speed of an object relative to the LiDAR system.

Light steering typically involves the projection of light in a pre-determined direction to facilitate, for example, the detection and ranging of an object, the illumination and scanning of an object, or the like. Light steering can be used in many different fields of applications including, for example, autonomous vehicles, medical diagnostic devices, etc., and can be configured to perform both transmission and reception of light. For example, a light steering transmitter may include a micro-mirror to control the projection direction of light to detect/image an object. Moreover, a light steering receiver may also include a micro-mirror to select a direction of incident light to be detected by the receiver, to avoid detecting other unwanted signals.

BRIEF SUMMARY OF THE INVENTION

Techniques disclosed herein relate generally to photodetector signal processing systems that can be used, for example, in light detection and ranging (LiDAR) systems or other distance detection systems. More specifically, and without limitation, disclosed herein are apparatus and methods for scanning an environment by moving the end of an optical fiber and detecting the reflected beam.

Certain embodiments provide an apparatus for determining the distance to an object by detecting a reflected light beam. A light emitter emits a light beam. An optical fiber is mounted to direct the light beam as an output light beam of the optical fiber. An actuator is coupled proximate a distal end of the optical fiber, operable to move the optical fiber in a desired pattern. Collimation optics are mounted to intercept the output light beam of the optical fiber and are operable to collimate the output light beam of the optical fiber. A photodetector is mounted to receive a reflected light beam after reflecting off an object in an external environment. A control system determines a distance to the object based on an elapsed time between emission of the light beam and a detection of the reflected light beam by the photodetector.

In one embodiment, the apparatus is part of a LiDAR system. The light beam is a pulsed laser, with the desired pattern being a spiral pattern. The laser is pulsed so that a pattern of laser pulses along the spiral pattern forms a rectangular grid that matches a rectangular array of photodetectors. The diameter or the footprint of the laser pulse at each photodetector can be about the same size as the photodetector, which will minimize the sunlight noise and minimize the energy loss. Alternately, x,y positions of laser pulses along the spiral pattern are recorded and are spaced sufficiently closely to allow detection of objects, without mapping to a rectangular grid.

Unlike display prior art, the distance is unknown, and thus optics to focus the beam on a particular spot are not used. Rather, optics are used to collimate the beam so that ideally it is substantially the same size at varying distances where an object may be encountered (although in practice there will be some increased divergence with distance). In certain embodiments, the collimation optics include one collimation lens or a collimation lens module with two or more lenses. For example, a single aspheric lens could be used, or a two lens system where one lens collimates the highly divergent beam and the second lens focusses it. In one embodiment, a collimating lens may be integrated with the tip of the optical fiber.

According to some embodiments, the actuator is a piezoelectric tube actuator. The optical fiber is designed to minimize the divergence of the emitted beam, such as by using a single mode fiber.

According to certain embodiments, a method for fiber scanning for distance detection is provided. The method includes emitting a light beam to an optical fiber and directing the light beam as an output light beam of the optical fiber. Another step is moving the optical fiber in a desired pattern, followed by collimating the output light beam of the optical fiber. A next step is receiving a reflected light beam after reflecting off an object in an external environment. Finally, another step is determining a distance to the object based on an elapsed time between emission of the light beam and a detection of the reflected light beam.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention, will be more apparent from the following detailed description taken in conjunction with the accompanying drawings, in which:

FIGS. 6A-B are diagrams illustrating the difference between a focused display beam and a collimated LiDAR beam for distance detection, according to embodiments;

DETAILED DESCRIPTION OF THE INVENTION

Aspects of the present disclosure relate generally to optical systems that can be used, for example, in light detection and ranging (LiDAR) systems or other light beam detection systems. More specifically, disclosed herein are apparatus and methods for detecting the distance to objects using a light beam from a moving optical fiber.

In the following description, various examples of a scanning fiber transmitter for distance detection are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Techniques disclosed herein relate generally to determining the distance to an object by detecting a reflected light beam. An optical fiber is moved in a desired pattern by an actuator. Output laser pulses are collimated and reflected off an object in the environment. A control system determines a distance to the object based on an elapsed time between emission of the light beam and a detection of the reflected light beam by a photodetector.

Figure 3:
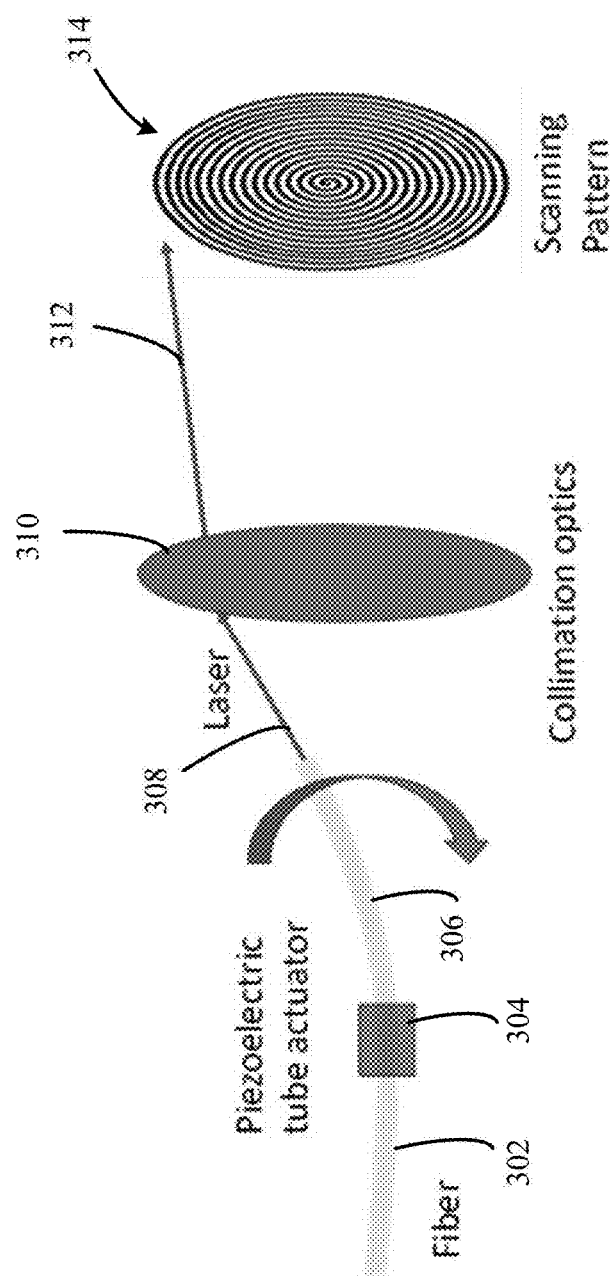
FIG. 3 is a diagram illustrating fiber optic distance scanning with a piezoelectric actuator according to an embodiment.
Figure 5:
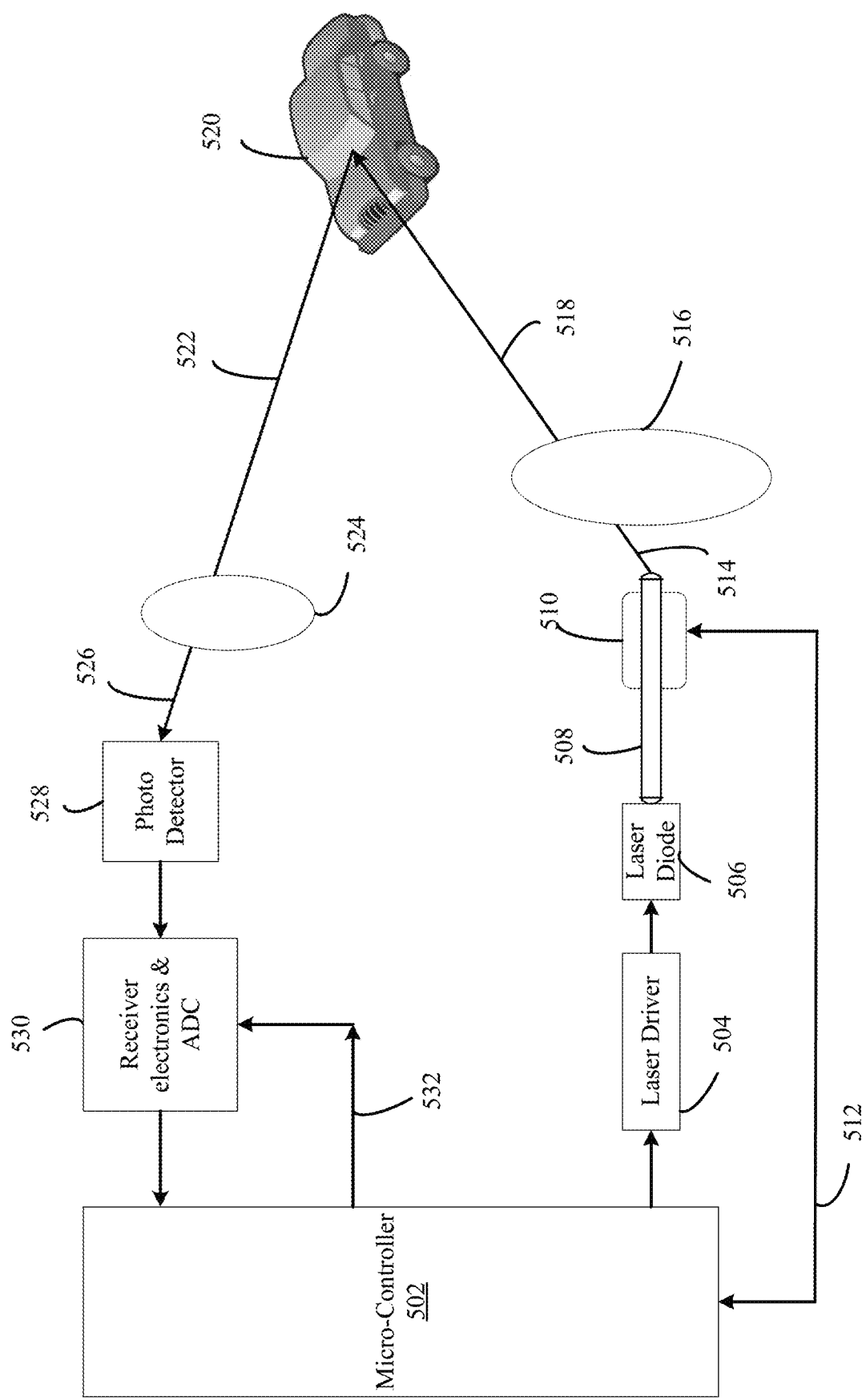
FIG. 5 is a block diagram of electronic circuits controlling fiber optic scanning for a distance detection system according to an embodiment.

More specifically, and without limitation, disclosed herein, as illustrated in FIGS. 3 and 5, is an apparatus and method for detecting a reflected laser beam in a Light Detection and Ranging (LiDAR) system of an autonomous vehicle. A laser diode 506 emits laser beam pulses. An optical fiber 508 is mounted to direct the laser beam pulses as output pulses of the optical fiber. An actuator 510 is coupled proximate a distal end of the optical fiber and is operable to move the optical fiber in a desired pattern. A microcontroller 502 has a control output 512 coupled to a control input of the actuator. A memory 908 is coupled to the microcontroller and has non-transitory computer readable media including a program for controlling the actuator to generate the desired pattern. Collimation optics 516 are mounted to intercept the output pulses of the optical fiber and are operable to collimate the output pulses of the optical fiber. A photodetector 528 is mounted to receive a reflected laser beam pulse after reflecting off an object in an external environment.

The system of these embodiments eliminate the need for an array of mirrors to direct an optical beam to an object. The following section describes such a LiDAR system into which embodiments of the present invention can be imbedded, replacing the described mirrors.

Typical Lidar System Environment for Certain Embodiments of the Invention

Figure 1:
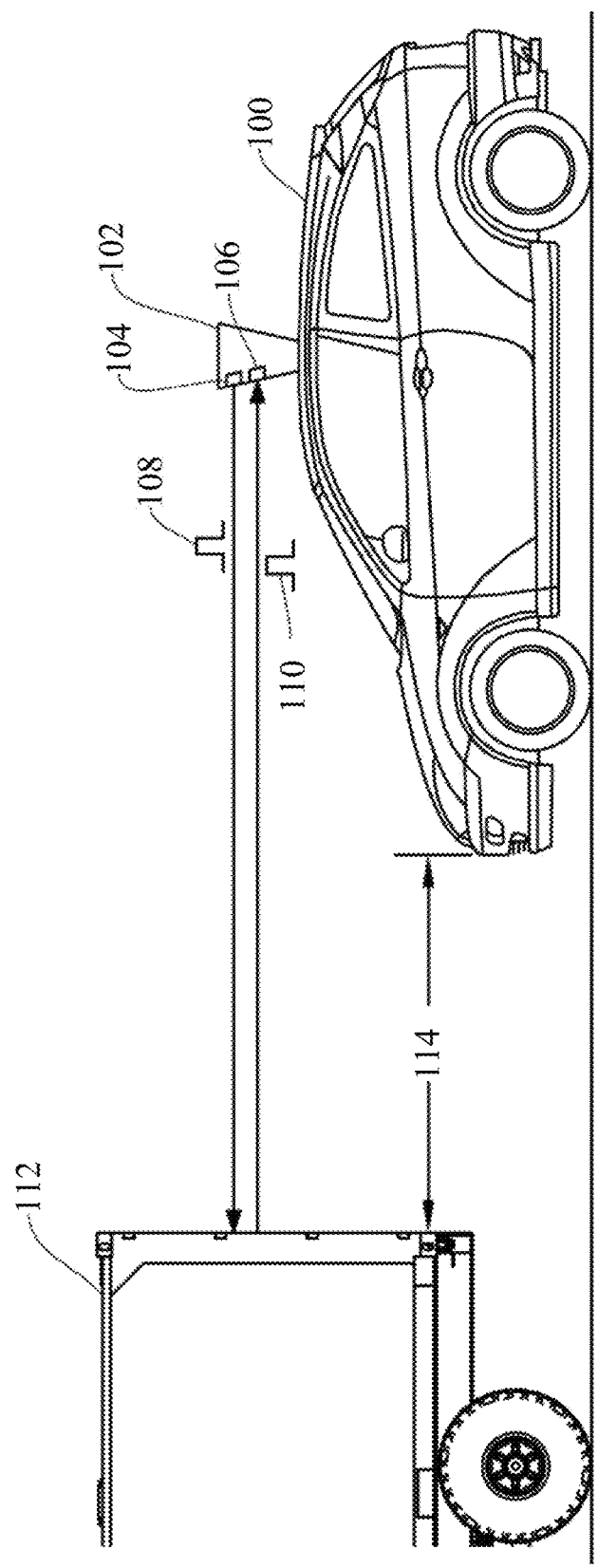
FIG. 1 shows an autonomous vehicle with a LiDAR system, according to certain embodiments.

FIG. 1 illustrates an autonomous vehicle 100 in which the various embodiments described herein can be implemented. Autonomous vehicle 100 can include a LiDAR module 102. LiDAR module 102 allows autonomous vehicle 100 to perform object detection and ranging in a surrounding environment. Based on the result of object detection and ranging, autonomous vehicle 100 can drive according to the rules of the road and maneuver to avoid a collision with detected objects. LiDAR module 102 can include a light steering transmitter 104 and a receiver 106. Light steering transmitter 104 can project one or more light signals 108 at various directions (e.g., incident angles) at different times in any suitable scanning pattern, while receiver 106 can monitor for a light signal 110 which is generated by the reflection of light signal 108 by an object. Light signals 108 and 110 may include, for example, a light pulse, an amplitude modulated continuous wave (AMCW) signal, etc. LiDAR module 102 can detect the object based on the reception of light signal 110, and can perform a ranging determination (e.g., a distance of the object) based on a time difference between light signals 108 and 110, as would be appreciated by one of ordinary skill in the art with the benefit of this disclosure. For example, as shown in FIG. 1, LiDAR module 102 can transmit light signal 108 at a direction directly in front of autonomous vehicle 100 at time T1 and receive light signal 110 reflected by an object 112 (e.g., another vehicle) at time T2. Based on the reception of light signal 110, LiDAR module 102 can determine that object 112 is directly in front of autonomous vehicle 100. Moreover, based on the time difference between T1 and T2, LiDAR module 102 can also determine a distance 114 between autonomous vehicle 100 and object 112. Autonomous vehicle 100 can thereby adjust its speed (e.g., slowing or stopping) to avoid collision with object 112 based on the detection and ranging of object 112 by LiDAR module 102.

Figure 2A:
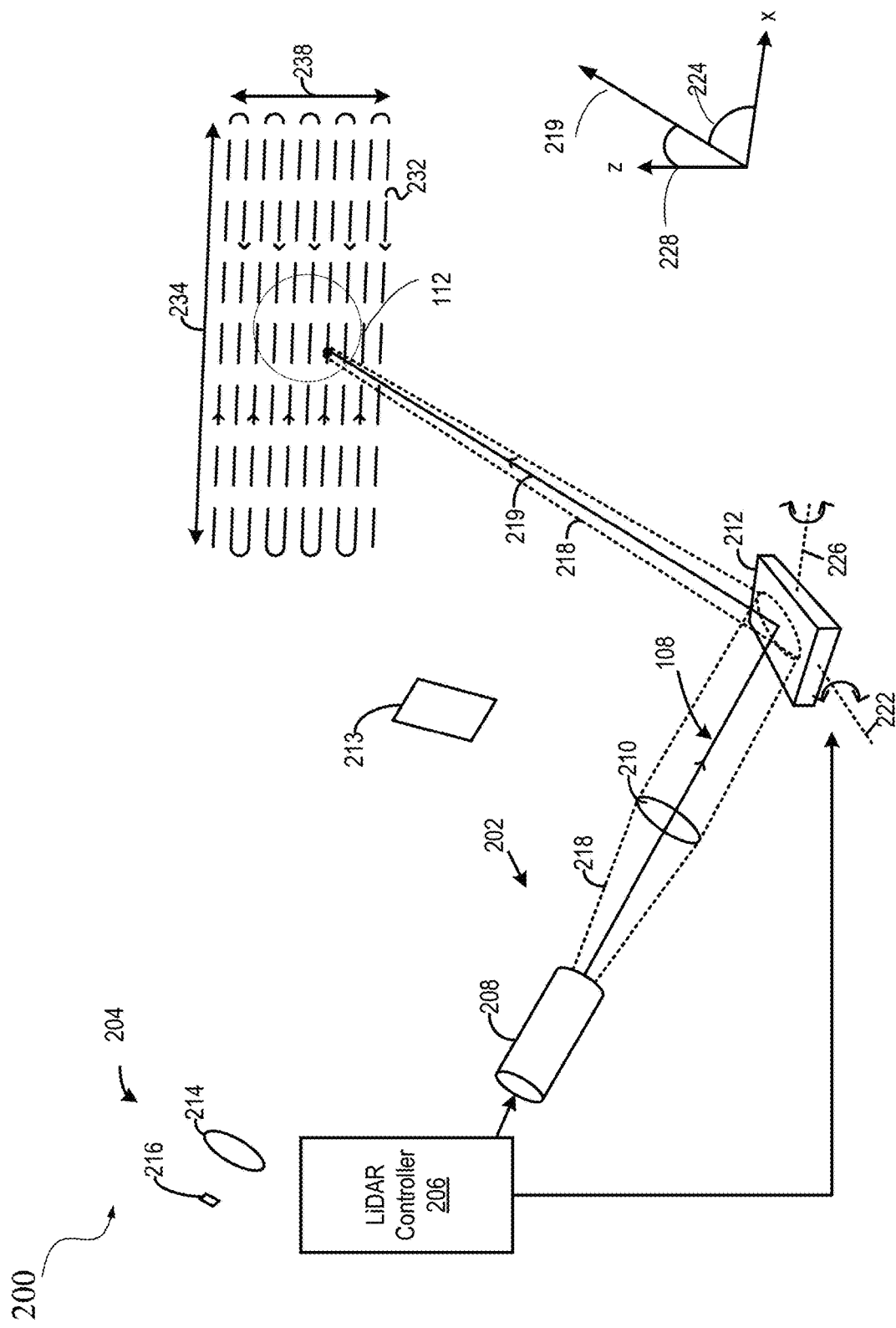
FIG. 2A shows an example of a prior light projection operation using mirrors to scan an object.
Figure 2B:
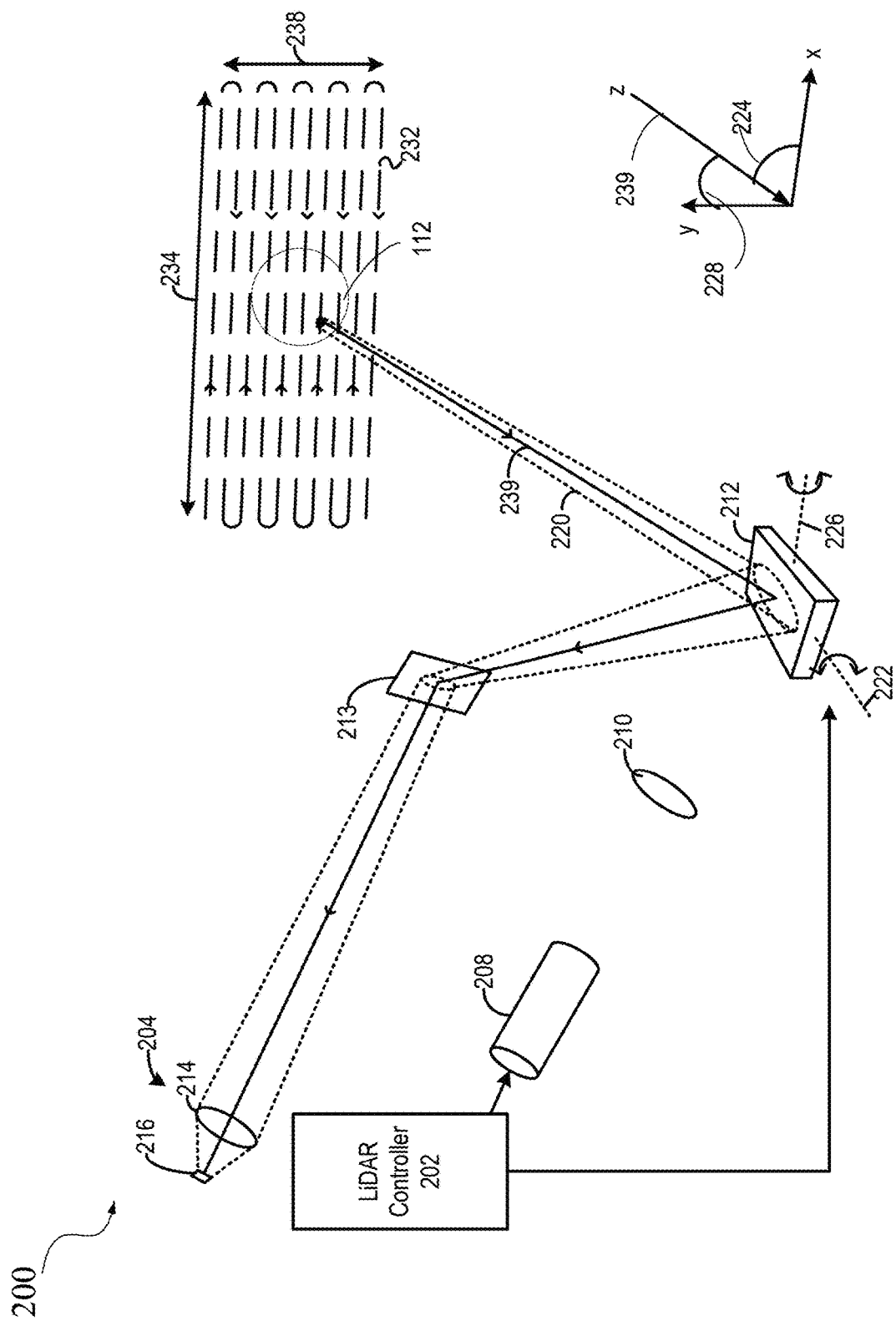
FIG. 2B shows an example of a light detection operation, using mirrors to redirect reflected light off an object to a photodetector.

FIG. 2A and FIG. 2B illustrate simplified block diagrams of an example of a prior, mirror scanning LiDAR module 200. Embodiments of the present invention substitute the fiber optic system for the mirrors of these embodiments. LiDAR module 200 may be an example of LiDAR system 102, and may include a transmitter 202, a receiver 204, and LiDAR controller 206, which may be configured to control the operations of transmitter 202 and receiver 204. Transmitter 202 may include a light source 208 and a collimator lens 210, and receiver 204 can include a lens 214 and a photodetector 216. LiDAR module 200 may further include a mirror assembly 212 (also referred to as a "mirror structure") and a beam splitter 213. In some embodiments, LiDAR module 102, transmitter 202 and receiver 204 can be configured as a coaxial system to share mirror assembly 212 to perform light steering operations, with beam splitter 213 configured to reflect incident light reflected by mirror assembly 212 to receiver 204.

FIG. 2A shows an example of a prior light projection operation using mirrors to scan an object. To project light, LiDAR controller 206 can control light source 208 (e.g., a pulsed laser diode, a source of FMCW signal, AMCW signal, etc.) to transmit light signal 108 as part of light beam 218. Light beam 218 can disperse upon leaving light source 208 and can be converted into collimated light beam 218 by collimator lens 210. Collimated light beam 218 can be incident upon a mirror assembly 212, which can reflect collimated light beam 218 to steer it along an output projection path 219 towards object 112. Mirror assembly 212 can include one or more rotatable mirrors. FIG. 2A illustrates mirror assembly 212 as having one mirror; however, a micro-mirror array may include multiple micro-mirror assemblies that can collectively provide the steering capability described herein. Mirror assembly 212 can further include one or more actuators (not shown in FIG. 2A) to rotate the rotatable mirrors. The actuators can rotate the rotatable mirrors around a first axis 222, and can rotate the rotatable mirrors along a second axis 226. The rotation around first axis 222 can change a first angle 224 of output projection path 219 with respect to a first dimension (e.g., the x-axis), whereas the rotation around second axis 226 can change a second angle 228 of output projection path 219 with respect to a second dimension (e.g., the z-axis). LiDAR controller 206 can control the actuators to produce different combinations of angles of rotation around first axis 222 and second axis 226 such that the movement of output projection path 219 can follow a scanning pattern 232. A range 234 of movement of output projection path 219 along the x-axis, as well as a range 238 of movement of output projection path 219 along the z-axis, can define a FOV. An object within the FOV, such as object 112, can receive and reflect collimated light beam 218 to form reflected light signal, which can be received by receiver 204 and detected by the LiDAR module, as further described below with respect to FIG. 2B.

FIG. 2B shows an example of a light detection operation, using mirrors to redirect reflected light off an object to a photodetector. LiDAR controller 206 can select an incident light direction 239 for detection of incident light by receiver 204. The selection can be based on setting the angles of rotation of the rotatable mirrors of mirror assembly 212, such that only light beam 220 propagating along light direction 239 gets reflected to beam splitter 213, which can then divert light beam 220 to photodetector 216 via collimator lens 214. With such arrangements, receiver 204 can selectively receive signals that are relevant for the ranging/imaging of object 112 (or any other object within the FOV), such as light signal 110 generated by the reflection of collimated light beam 218 by object 112, and not to receive other signals. As a result, the effect of environmental disturbance on the ranging and imaging of the object can be reduced, and the system performance may be improved.

Scanning Fiber Transmitter for Distance Detection

FIG. 3 is a diagram illustrating fiber optic distance scanning with a piezoelectric actuator according to an embodiment. An optical fiber 302 provides a laser beam. A piezoelectric tube actuator 304 moves an end 306 of the fiber optic in a desired pattern. Other actuators or motors could be substituted for piezoelectric tube actuator 304.

An emitted laser beam 308 is collimated by a collimating lens module 310 to produce a collimated laser beam 312. Such a collimated beam will maintain its image footprint at different distances, to make it useful for distance detection of objects of unknown location. Piezoelectric tube actuator 304 moves the end 306 of fiber optic 302 in a spiral direction, to form a spiral scanning pattern 314. Alternately, any other scanning pattern may be used. A classic linear raster scan pattern could be used, or a series of circles, sine waves, ellipses, sections of a parabola. or other patterns could be used. For example, any Lissajous curve trajectory may be used.

However, a spiral or other curved shape presents advantages. A classic linear raster scanning technique is inefficient because a beam-directing device cannot instantaneously start or stop its movement due to inertia. At the end of each line segment, the beam must be directed back or redirected to begin scanning a new line. During this time, no useful data is collected. This limits the time resolution (e.g., the number of images that can be collected per unit time).

The fiber 302 can be single mode fiber, multi-mode fiber, photocrystal fiber, etc. The piezoelectric tube actuator 304 can be any kind of high-speed actuator. The collimation optics 310 can be one or more optics or lenses. In one embodiment, the collimating optics are integrated in the tip of the fiber optic, using a bulb or other curved shape to the tip. Additionally, the tip region of the fiber optic may be mounted in a cantilevered fashion, and the portion that moves may have a thinner cross section. An example of such a design is shown in US Patent Application Pub. No. 2005/0173817, the disclosure of which is hereby incorporated herein by reference. The end 306 of fiber optic 302 moves with respect to the fixed laser diode and drive. In addition, and while the fiber is moving, the whole mechanism can move, such as rotating to give a 360 degree view around a vehicle in which the LiDAR system is mounted.

Compared to a classic, tilting mirror method of scanning an environment, embodiments using a moving fiber optic present advantages. The need for an array of mirrors is removed, along with the control mechanism for the mirrors. In addition, designing a mirror structure to allow the mirrors to rotate at a resonant frequency corresponding to the desired scan rate is no longer needed, simplifying the fabrication.

In one embodiment piezoelectric tube actuator 304 drives the end 306 of the fiber optic at one of the fiber's mechanical resonance frequencies so as to deflect the end 306 in a spiral pattern. The spiral pattern can be an expanding spiral pattern or a shrinking spiral pattern. In one embodiment, the movement of the resonating optical fiber is controlled by two amplitude modulating sinusoidal drive signals applied alternatively to the piezoelectric tube actuator 304. Each drive signal corresponds to an axis of movement of the optical fiber. The drive signals can be applied to each quadrant of the piezoelectric tube actuator 304 via multiple electrodes. Orthogonal pairs of electrodes correspond to an axis of the optical fiber. The motion of the optical fiber can be an expanding spiral, moving from the center outward. When the optical fiber reaches the outermost ring of the spiral pattern, a braking signal can be applied to the piezoelectric tube actuator (opposite the direction of motion of the fiber) to rapidly force the fiber back to the center of the spiral pattern, thereby preparing for the next outward spiral scan. The braking signal is applied at a frequency and phase which minimizes residual vibrations. For example, a braking signal can be applied to vibrate the optical fiber, with the braking signal having a frequency approximately equal to the resonant frequency, with a root displacement in the opposite direction of the motion of the fiber. Alternatively, the optical fiber is driven without using any braking signals, instead alternating outward and inward scan patterns.

The piezoelectric tube actuator's vibration equation can be represented as follows:

$$x = A\cos(\omega t + \varphi)$$

where A is the vibration amplitude, ω is the vibration frequency, and φ is the phase. The vibration can be controlled in two directions with different amplitude, frequency, and phase. The scanning pattern is based on the modulation of one or more of the amplitude, frequency, and phase.

In one embodiment, the piezoelectric tube actuator deforms when the electric field of the control signal is applied. The deformation generates a charge which can be detected. Thus, the tube piezoelectric actuator also can provide a sensing signal indicating the displacement of the piezoelectric actuator and optical fiber. This displacement signal is used in one embodiment to determine the position of the end 306 of the optical fiber. The displacement signal is used as feedback to dynamically adjust the control signals during operation so as to improve the accuracy of the desired scanning position. This can be useful when different environmental conditions (e.g., temperature) affect the position or resonant frequency of the fiber. Alternately, external sensors (such as position sensing detectors) can be used to determine the position of the end 306 of the optical fiber.

Figure 4:
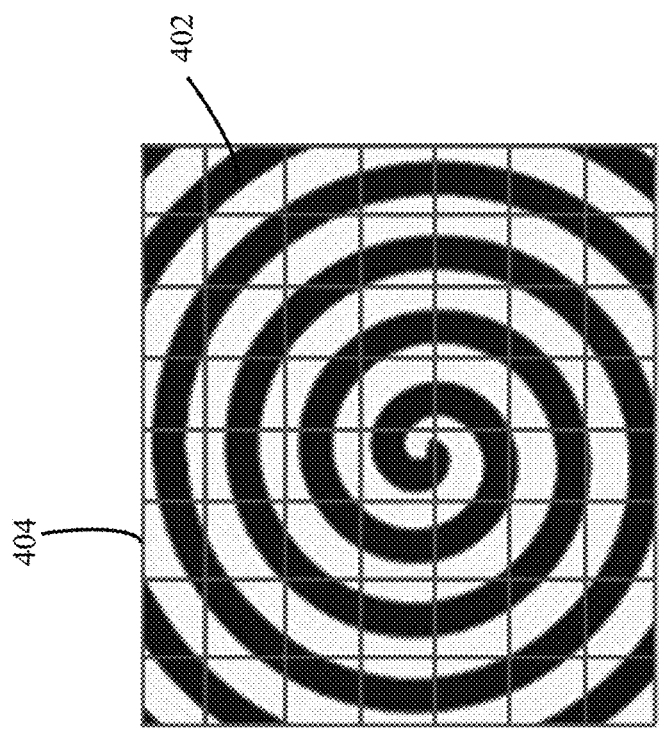
FIG. 4 is a diagram of a spiral scanning pattern overlaid on a square grid pattern according to an embodiment.

FIG. 4 is a diagram of a spiral scanning pattern overlaid on a square grid pattern according to an embodiment. The spiral pattern 402 is designed to intersect with each and every square in a pixel grid 404. Pixel grid 404 corresponds to an array of photodetectors in one embodiment. The diameter or the footprint of the laser pulse at each photodetector can be about the same size as the photodetector, which will minimize the sunlight noise and minimize the energy loss. The spiral pattern need not align exactly with the grid, since the goal is not to generate a display with evenly spaced pixels, but rather to detect a distance to an object in each square (or polygon or other shape) of the grid. It is sufficient for this purpose that the spiraling laser intersect with some portion of each element of the grid. For some squares, it may go through the middle, for others it goes through the edge. For some squares, two spiral circles may go through different corners of a square of the grid. However, the computer programming controlling the pulsed laser can cause a laser pulse to be sent only on one of the passes through the same square on the grid. Alternately, in another embodiment, the laser can be controlled to move slightly perpendicular to the spiral as needed to keep it in the center of each grid. This will produce somewhat of a zig-zag in the spiral pattern.

In one embodiment, the grid is designed so that the laser beam width is one third to one half of the width of a square in the grid. This ensures that the spiral pattern passes through each square of the grid, while minimizing duplicate passes through the same grid square. In addition, the spacing between spirals can be controlled. In one embodiment, the spacing is approximately the same width as the width of the laser beam in the spiral pattern.

In another embodiment, no mapping to a rectangular grid is needed. Unlike display technology, there is no need for evenly spaced "pixels" to present a smooth image. Rather, detecting object distances is what is needed. Thus, all that is needed is the x/y coordinate on the spiral or other pattern of each laser pulse. The laser pulse x,y positions do not need to be evenly spaced, as long as they are close enough to not miss objects of a size that would be of a concern.

FIG. 5 is a block diagram of electronic circuits controlling fiber optic scanning for a distance detection system according to an embodiment. A micro-controller 502 controls a laser driver 504 to pulse a laser diode 506 to produce laser pulses in accordance with a desired pattern. A fiber optic 508 receives the output of laser diode 506. A piezoelectric tube actuator 510 moves fiber optic 508 to produce a desired pattern, such as a spiral pattern. Piezoelectric tube actuator 510 is controlled by micro-controller 502 through a control line 512. Additionally, piezoelectric tube actuator 510 may send sensor signals regarding its position back to micro-controller 502 in some embodiments.

An output laser beam 514 from fiber optic 508 is directed to a collimating lens module 516, which produces a collimated laser beam 518. Laser beam 518 will reflect off an object 520 in the environment. A reflected beam 522 is directed by optical module 524 as a redirected beam 526 to a photodetector 528. Optical module 524 focuses the reflected beam 522 onto photodetector 528. The output of photodetector 528 is processed through receiver electronics & ADC (analog-to-digital converter) 530. Microcontroller 502 controls aspects of receiver electronics & ADC 530 through control line 532. Controls can include the gain, noise threshold and other variables of the receiver electronics.

FIGS. 6A-B are diagrams illustrating the difference between a prior art focused display beam and a collimated LiDAR beam for distance detection, according to embodiments. FIG. 6A illustrates, for a display, the lens or the lens module need to focus the laser (or light) on a close display. An optical fiber 602 emits an output laser beam 604 that is diverging. The divergence angle of the output beam can be very large. An optical module 606 produces a focused beam. Thus, the laser beam (or light beam) output 614 is a focused beam, with a near distance focal point that is focused on a display 616.

FIG. 6B illustrates, for a LiDAR application, a lens module 618 needed to collimate the laser. Usually, the object for the LiDAR application is at a far distance. Thus, a collimated beam can reduce the energy loss in a long distance and keep the beam size small. An optical fiber 603 emits an output laser beam 605 that is diverging. The divergence angle of the output beam 605 is designed to be very small for this application. The small divergence can be achieved by a number of mechanisms as discussed below. An optical module 618 produces a collimated beam. Optical module 618 consists of one or more collimating lenses. For example, a single aspheric lens could be used, or a two lens system where one lens collimates the highly divergent beam and the second lens focusses it. In one embodiment, a collimating lens may be integrated with the tip of the optical fiber. The collimated beam 626 exiting the lens module 618 is produced, and then reflects off a distant object 628.

The scanning fiber optic output beam has a low divergence in some embodiments. There are a variety of ways to accomplish this. Assuming the fiber core diameter is d and the focal length of the collimating lens or lens module is f, the output beam divergence angle is $$\theta = \frac{d}{f}$$

The divergence angle is important since it is related to the scanning resolution. If the divergence angle is large, the laser spot on the object will be large too. A large laser beam would limit the scanning resolution. Thus, reducing the divergence angle increases the scanning resolution.

One solution to limiting beam divergence is using a fiber with a small core diameter, such as single mode fiber. Another solution is to design a lens module 618 with long focal length. In one embodiment, the focal length is determined by the divergence angle. If the divergence angle is large (such as flash Lidar), the focal lens may be very short. If the divergence angle is small (such as long range Lidar), the focal lens needs to be very long.

Figure 7:
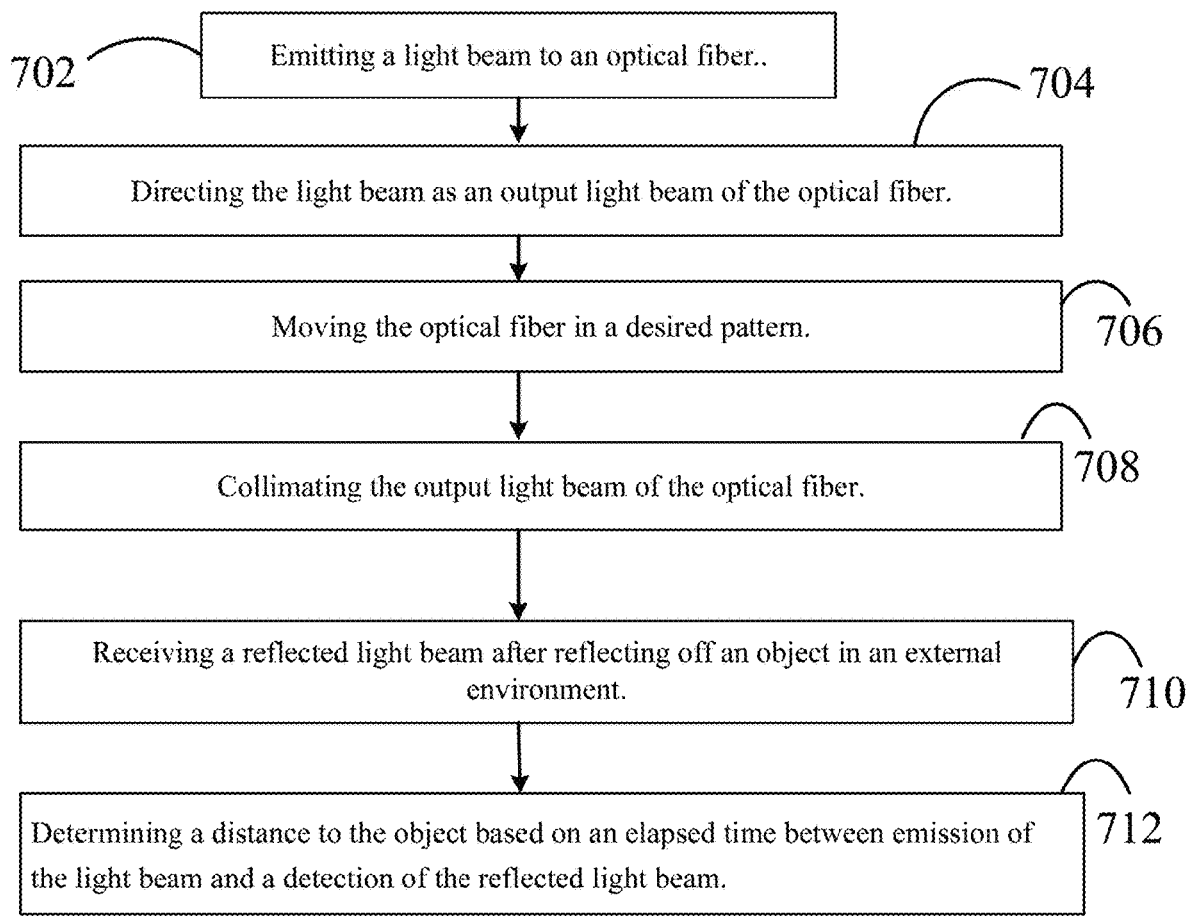
FIG. 7 is a flow chart of a method for fiber scanning for distance detection, according to an embodiment.

FIG. 7 is a flow chart of a method for fiber scanning for distance detection, according to an embodiment. The method includes a step 702 of emitting a light beam to an optical fiber. Step 704 is directing the light beam as an output light beam of the optical fiber. Step 706 is moving the optical fiber in a desired pattern. Step 708 is collimating the output light beam of the optical fiber. Step 710 is receiving a reflected light beam after reflecting off an object in an external environment. Finally, step 712 is determining a distance to the object based on an elapsed time between emission of the light beam and a detection of the reflected light beam.

In summary, embodiments provide an apparatus for determining the distance to an object 520 of FIG. 5 by detecting a reflected light beam. A light emitter 506 emits a light beam. An optical fiber 508 is mounted to direct the light beam as an output light beam 514 of the optical fiber. An actuator 510 is coupled proximate a distal end of the optical fiber 508, operable to move the optical fiber in a desired pattern (e.g., spiral pattern 402 of FIG. 4). Collimation optics 516 are mounted to intercept the output light beam of the optical fiber and are operable to collimate the output light beam of the optical fiber. A photodetector 528 is mounted to receive a reflected light beam after reflecting off an object in an external environment. A control system 502 determines a distance to the object based on an elapsed time between emission of the light beam and a detection of the reflected light beam by the photodetector.

Example LiDAR System Implementing Aspects of Embodiments Herein

Figure 8:
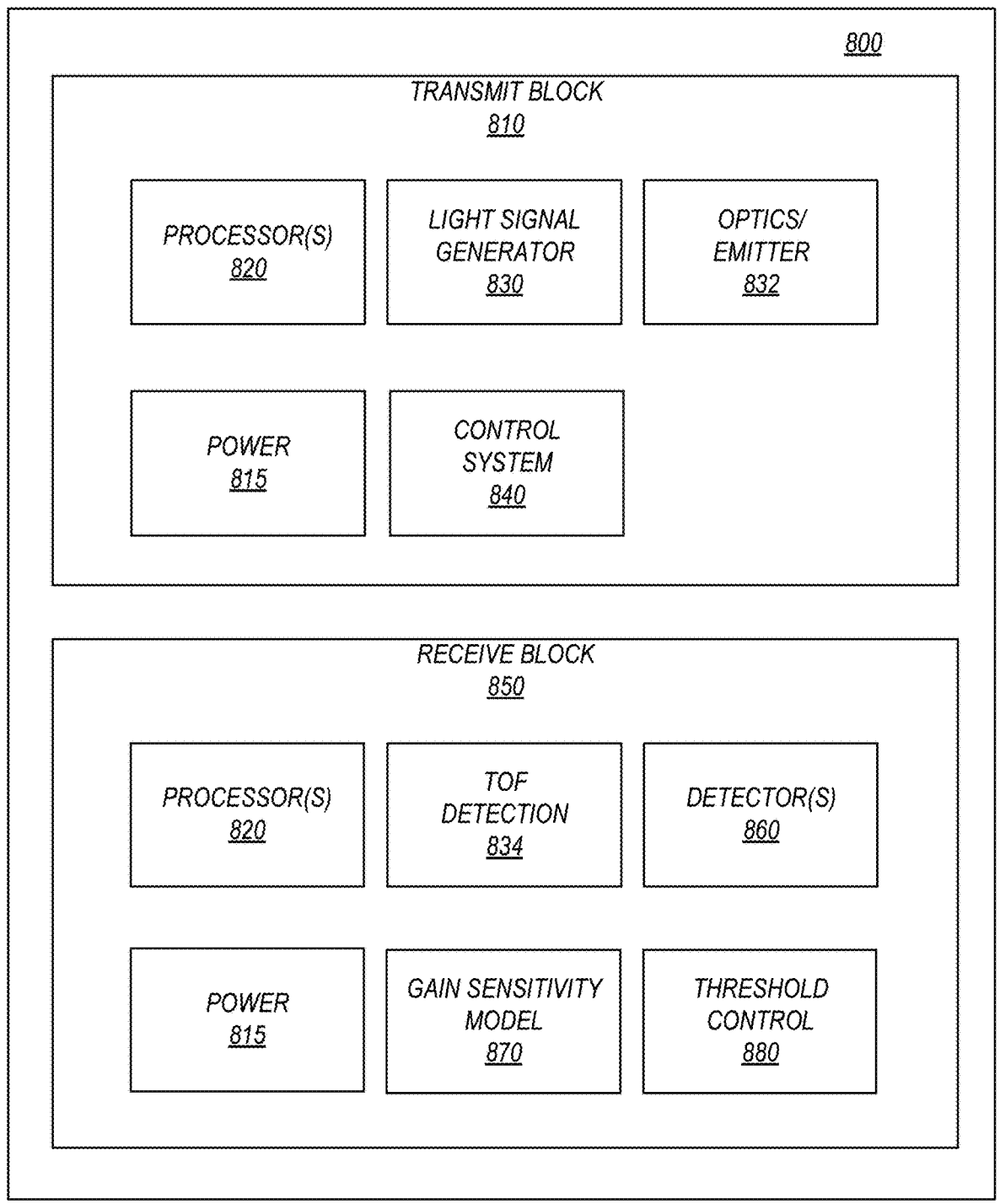
FIG. 8 illustrates a simplified block diagram showing aspects of a LiDAR-based detection system, according to certain embodiments of the invention.

FIG. 8 illustrates a simplified block diagram showing aspects of a LiDAR-based detection system 800 incorporating the scanning fiber transmitter system described above, according to certain embodiments. System 800 may be configured to transmit, detect, and process LiDAR signals to perform object detection as described above with regard to LiDAR system 100 described in FIG. 1. In general, a LiDAR system 800 includes one or more transmitters (e.g., transmit block 810) and one or more receivers (e.g., receive block 850). LiDAR system 800 may further include additional systems that are not shown or described to prevent obfuscation of the novel features described herein.

Transmit block 810, as described above, can incorporate a number of systems that facilitate that generation and emission of a light signal, including dispersion patterns (e.g., 360 degree planar detection), pulse shaping and frequency control, Time-Of-Flight (TOF) measurements, and any other control systems to enable the LiDAR system to emit pulses in the manner described above. In the simplified representation of FIG. 8, transmit block 810 can include processor(s) 820, light signal generator 830, optics/emitter module 832, power block 815 and control system 840. Some of all of system blocks 820-840 can be in electrical communication with processor(s) 820.

In certain embodiments, processor(s) 820 may include one or more microprocessors (μCs) and can be configured to control the operation of system 800. Alternatively or additionally, processor 820 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, μCs, DSPs, ASIC, programmable logic device, and the like, may be configured in other system blocks of system 800. For example, control system block 840 may include a local processor to certain control parameters (e.g., operation of the emitter). Processor(s) 820 may control some or all aspects of transmit block 810 (e.g., optics/emitter 832, control system 840, fiber 508 position as shown in FIG. 5, position sensitive device 250, etc.), receive block 850 (e.g., processor(s) 820) or any aspects of LiDAR system 800. Processor(s) 820 also create the desired pattern (e.g., spiral pattern) of the laser pulses, and detect the arrival time of the digitized pulse in one embodiment. In some embodiments, multiple processors may enable increased performance characteristics in system 800 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Light signal generator 830 may include circuitry (e.g., a laser diode) configured to generate a light signal, which can be used as the LiDAR send signal, according to certain embodiments. In some cases, light signal generator 830 may generate a laser that is used to generate a continuous or pulsed laser beam at any suitable electromagnetic wavelengths spanning the visible light spectrum and non-visible light spectrum (e.g., ultraviolet and infra-red). In some embodiments, lasers are commonly in the range of 600-1550 nm, although other wavelengths are possible, as would be appreciated by one of ordinary skill in the art.

Optics/Emitter block 832 (also referred to as transmitter 832) may include the scanning optical fiber transmitters as described above in FIGS. 3-7) for redirecting and/or aiming the emitted laser pulse, mechanical structures to control spinning and/or moving of the emitter system, or other system to affect the system field-of-view, as would be appreciated by one of ordinary skill in the art with the benefit of this disclosure. For instance, some systems may incorporate a beam expander (e.g., convex lens system) in the emitter block that can help reduce beam divergence and increase the beam diameter. These improved performance characteristics may mitigate background return scatter that may add noise to the return signal. In some cases, optics/ emitter block 832 may include a beam splitter to divert and sample a portion of the pulsed signal. For instance, the sampled signal may be used to initiate the TOF clock. In some cases, the sample can be used as a reference to compare with backscatter signals. Some embodiments may employ micro electromechanical mirrors (MEMS) that can reorient light to a target field. Alternatively or additionally, multi-phased arrays of lasers and arrays of optical fibers may be used. Any suitable system may be used to emit the LiDAR send pulses, as would be appreciated by one of ordinary skill in the art.

Power block 815 can be configured to generate power for transmit block 810, receive block 850, as well as manage power distribution, charging, power efficiency, and the like. In some embodiments, power management block 815 can include a battery (not shown), and a power grid within system 800 to provide power to each subsystem (e.g., control system 840, etc.). The functions provided by power management block 815 may be subsumed by other elements within transmit block 810, or may provide power to any system in LiDAR system 800. Alternatively, some embodiments may not include a dedicated power block and power may be supplied by a number of individual sources that may be independent of one another.

Control system 840 may control aspects of light signal generation (e.g., pulse shaping), optics/emitter control, TOF timing, or any other function described herein. In some cases, aspects of control system 840 may be subsumed by processor(s) 820, light signal generator 830, or any block within transmit block 810, or LiDAR system 800 in general.

Receive block 850 may include circuitry configured to detect and process a return light pulse to determine a distance of an object, and in some cases determine the dimensions of the object, the velocity and/or acceleration of the object, and the like. Processor(s) 1065 may be configured to perform operations such as processing received return pulses from detectors(s) 860, controlling the operation of TOF module 834, controlling threshold control module 880, or any other aspect of the functions of receive block 850 or LiDAR system 800 in general. Processor(s) 1065 also controls the piezoelectric tube actuator 510 as described above.

TOF module 834 may include a counter for measuring the time-of-flight of a round trip for a send and return signal. In some cases, TOF module 834 may be subsumed by other modules in LiDAR system 800, such as control system 840, optics/emitter 832, or other entity. TOF modules 834 may implement return "windows" that limit a time that LiDAR system 800 looks for a particular pulse to be returned. For example, a return window may be limited to a maximum amount of time it would take a pulse to return from a maximum range location (e.g., 250 m). Some embodiments may incorporate a buffer time (e.g., maximum time plus 10%). TOF module 834 may operate independently or may be controlled by other system block, such as processor(s) 820, as described above. In some embodiments, transmit block may also include a TOF detection module. One of ordinary skill in the art with the benefit of this disclosure would appreciate the many modification, variations, and alternative ways of implementing the TOF detection block in system 800.

Detector(s) 860 may detect incoming return signals that have reflected off one or more objects, and can also include gain sensitivity module 870 and threshold control 880, described below. In some cases, LiDAR system 800 may employ spectral filtering based on wavelength, polarization, and/or range to help reduce interference, filter unwanted frequencies, or other deleterious signals that may be detected. Typically, detector(s) 860 can detect an intensity of light and records data about the return signal (e.g., via coherent detection, photon counting, analog signal detection, or the like). Detector (s) 860 can use any suitable photodetector technology including solid state photodetectors (e.g., silicon avalanche photodiodes, complimentary metal-oxide semiconductors (CMOS), charge-coupled devices (CCD), hybrid CMOS/CCD devices) or photomultipliers. In some cases, a single receiver may be used or multiple receivers may be configured to operate in parallel.

Gain sensitivity model 870 may include systems and/or algorithms for determining a gain sensitivity profile that can be adapted to a particular object detection threshold. The gain sensitivity profile can be modified based on a distance (range value) of a detected object (e.g., based on TOF measurements). In some cases, the gain profile may cause an object detection threshold to change at a rate that is inversely proportional with respect to a magnitude of the object range value. A gain sensitivity profile may be generated by hardware/software/firmware, or gain sensor model 870 may employ one or more look up tables (e.g., stored in a local or remote database) that can associate a gain value with a particular detected distance or associate an appropriate mathematical relationship there between (e.g., apply a particular gain at a detected object distance that is 10% of a maximum range of the LiDAR system, apply a different gain at 15% of the maximum range, etc.). In some cases, a Lambertian model may be used to apply a gain sensitivity profile to an object detection threshold. The Lambertian model typically represents perfectly diffuse (matte) surfaces by a constant bidirectional reflectance distribution function (BRDF), which provides reliable results in LiDAR system as described herein. However, any suitable gain sensitivity profile can be used including, but not limited to, Oren-Nayar model, Nanrahan-Krueger model, Cook-Torrence model, Diffuse BRDF model, Limmel-Seeliger model, Blinn-Phong model, Ward model, HTSG model, Fitted Lafortune Model, or the like. One of ordinary skill in the art with the benefit of this disclosure would understand the many alternatives, modifications, and applications thereof.

Threshold control block 880 may set an object detection threshold for LiDAR system 800. For example, threshold control block 880 may set an object detection threshold over a certain a full range of detection for LiDAR system 800. The object detection threshold may be determined based on a number of factors including, but not limited to, noise data (e.g., detected by one or more microphones) corresponding to an ambient noise level, and false positive data (typically a constant value) corresponding to a rate of false positive object detection occurrences for the LiDAR system. In some embodiments, the object detection threshold may be applied to the maximum range (furthest detectable distance) with the object detection threshold for distances ranging from the minimum detection range up to the maximum range being modified by a gain sensitivity model (e.g., Lambertian model).

Although certain systems may not expressly discussed, they should be considered as part of system 800, as would be understood by one of ordinary skill in the art. For example, system 800 may include a bus system (e.g., CAMBUS) to transfer power and/or data to and from the different systems therein. In some embodiments, system 800 may include a storage subsystem (not shown). A storage subsystem can store one or more software programs to be executed by processors (e.g., in processor(s) 820). It should be understood that "software" can refer to sequences of instructions that, when executed by processing unit(s) (e.g., processors, processing devices, etc.), cause system 800 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., laser pulse pattern control, etc.) as described herein. Some software controlled aspects of LiDAR system 800 may include aspects of gain sensitivity model 870, threshold control 880, control system 840, TOF module 834, or any other aspect of LiDAR system 800.

It should be appreciated that system 800 is meant to be illustrative and that many variations and modifications are possible, as would be appreciated by one of ordinary skill in the art. System 800 can include other functions or capabilities that are not specifically described here. For example, LiDAR system 800 may include a communications block (not shown) configured to enable communication between LiDAR system 800 and other systems of the vehicle or remote resource (e.g., remote servers), etc., according to certain embodiments. In such cases, the communications block can be configured to provide wireless connectivity in any suitable communication protocol (e.g., radio-frequency (RF), Bluetooth, BLE, infra-red (IR), ZigBee, Z-Wave, Wi-Fi, or a combination thereof).

While system 800 is described with reference to particular blocks (e.g., threshold control block 880), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 800 may be combined with or operated by other sub-systems as informed by design. For example, power management block 815 and/or threshold control block 880 may be integrated with processor(s) 820 instead of functioning as separate entities.

Example Computer Systems Implementing Aspects of Embodiments Herein

Figure 9:
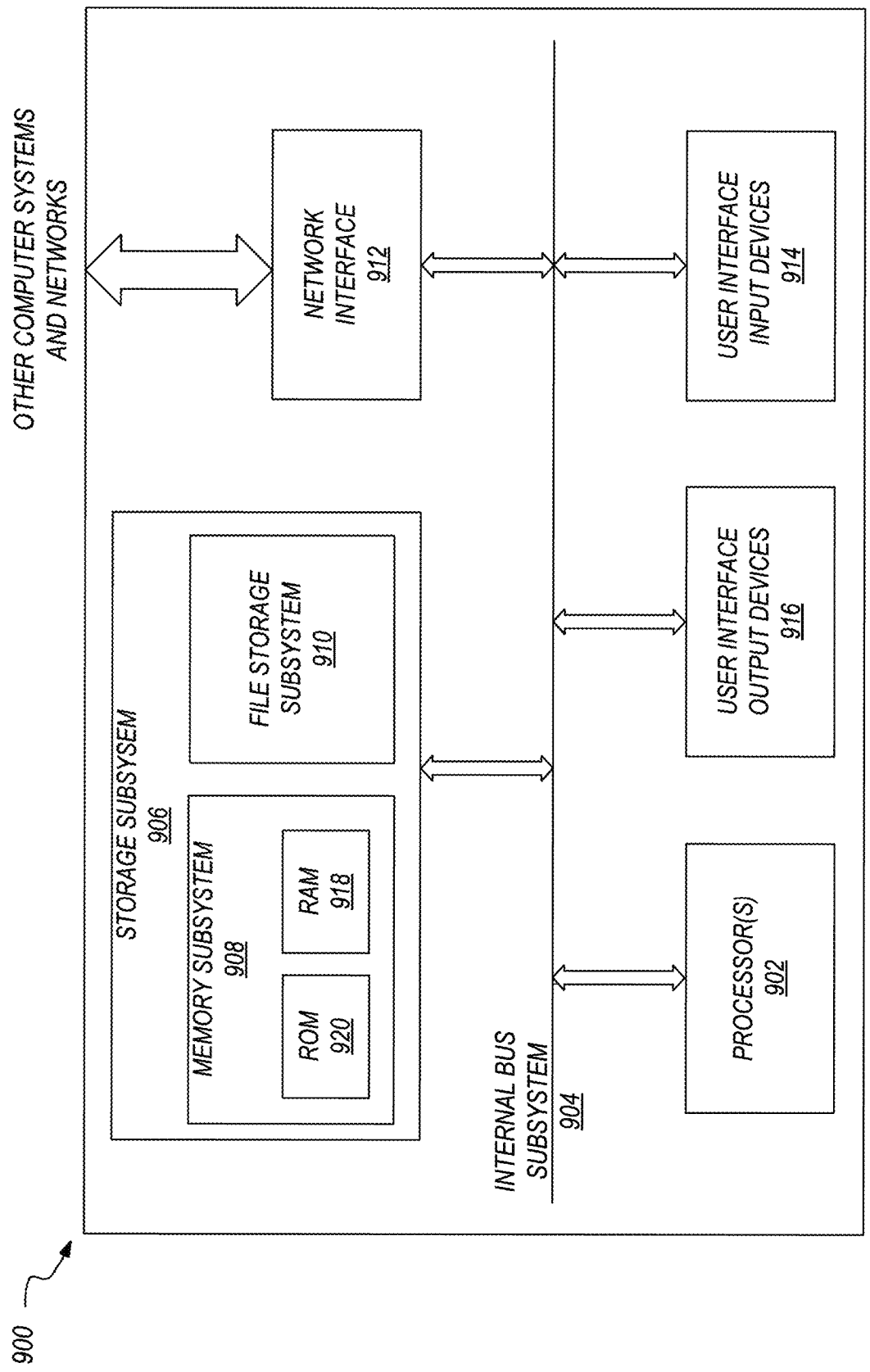
FIG. 9 illustrates an example computer system that may be utilized to implement techniques disclosed herein, according to certain embodiments of the invention.

FIG. 9 is a simplified block diagram of computer system 900 configured to operate aspects of a LiDAR-based detection system, according to certain embodiments. Computing system 900 can be used to implement any of the systems and modules discussed above with respect to FIGS. 1-6. For example, computing system 900 may operate aspects of threshold control 880, TOF module 834, processor(s) 820, control system 840, or any other element of LiDAR system 800 or other system described herein. Computing system 900 can include, for example, a field programmable gate array (FPGA), an application specific integrated circuit (ASIC), and a general purpose central processing unit (CPU), to implement the disclosed techniques, including the techniques described from FIG. 1—FIG. 7, such as microcontroller 502. In some examples, computing system 1100 can also can also include one or more processors 902 that can communicate with a number of peripheral devices (e.g., input devices) via a bus subsystem 904. These peripheral devices can include storage subsystem 906 (comprising memory subsystem 908 and file storage subsystem 910), user interface input devices 914, user interface output devices 916, and a network interface subsystem 912.

In some examples, internal bus subsystem 904 (e.g., CAMBUS) can provide a mechanism for letting the various components and subsystems of computer system 900 communicate with each other as intended. Although internal bus subsystem 904 is shown schematically as a single bus, alternative embodiments of the bus subsystem can utilize multiple buses. Additionally, network interface subsystem 912 can serve as an interface for communicating data between computing system 900 and other computer systems or networks. Embodiments of network interface subsystem 912 can include wired interfaces (e.g., Ethernet, CAN, RS232, RS485, etc.) or wireless interfaces (e.g., ZigBee, Wi-Fi, cellular, etc.).

In some cases, user interface input devices 914 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computing system 900. Additionally, user interface output devices 916 can include a display subsystem, a printer, or non-visual displays such as audio output devices, etc. The display subsystem can be any known type of display device. In general, use of the term "output device" is intended to include all possible types of devices and mechanisms for outputting information from computing system 900.

Storage subsystem 906 can include memory subsystem 908 and file/disk storage subsystem 910. Subsystems 908 and 910 represent non-transitory computer-readable storage media that can store program code and/or data that provide the functionality of embodiments of the present disclosure. In some embodiments, memory subsystem 908 can include a number of memories including main random access memory (RAM) 918 for storage of instructions and data during program execution and read-only memory (ROM) 920 in which fixed instructions may be stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art. The memory system can contain a look-up table providing the wavelength corresponding to a detected temperature of the laser diode.

It should be appreciated that computer system 900 is illustrative and not intended to limit embodiments of the present disclosure. Many other configurations having more or fewer components than computing system 900 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local-area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server (s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the examples, alternative examples, etc., and the concepts thereof may be applied to any other examples described and/or within the spirit and scope of the disclosure.

For example, instead of using a single fiber optic, an array of fibers may be used. Also, the pattern generation and decoding could be hard-wired, in firmware or in software in different embodiments.

The scanning fiber transmitter for distance detection of the present invention can be used in a variety of other applications than LIDAR. Light beam steering and detection techniques can also be used in other optical systems. In various light beam steering systems, the light beam may be steered by, for example, a rotating platform driven by a motor, a multi-dimensional mechanical stage, a Galvo-controlled mirror, a resonant fiber, an array of microelectromechanical (MEMS) mirrors, or any combination thereof. A MEMS micro-mirror may be rotated around a pivot or connection point by, for example, a micro-motor, an electromagnetic actuator, an electrostatic actuator, or a piezoelectric actuator.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

What is claimed is:

1. An apparatus for detecting a reflected laser beam in a Light Detection and Ranging (LiDAR) system of an autonomous vehicle, the apparatus comprising:
   a laser diode emitting laser beam pulses;
   an optical fiber providing the laser beam pulses as output pulses of the optical fiber;
   an actuator, coupled proximate a distal end of the optical fiber, operable to move the distal end of the optical fiber in a desired pattern;
   a microcontroller having a control output coupled to a control input of the actuator;
   a memory, coupled to the microcontroller, the memory having a non-transitory computer readable media including a program for controlling the actuator to generate the desired pattern, wherein the program includes instructions for controlling the actuator to cause the output pulses of the optical fiber to form a spiral pattern, with a position of the optical pulses along the spiral pattern forming a rectangular grid; and
   collimation optics, mounted to intercept the output pulses of the optical fiber and operable to collimate the output pulses of the optical fiber.

2. The apparatus of claim 1 further comprising:
   a photodetector mounted to receive a reflected laser beam pulse after reflecting off an object in an external environment; and
   a control system for determining a distance to the object based on an elapsed time between emission of the laser beam pulses and a detection of the reflected laser beam pulses by the photodetector.

3. The apparatus of claim 1 wherein the desired pattern is a spiral pattern.

4. The apparatus of claim 1 wherein the actuator is a piezoelectric tube actuator.

5. The apparatus of claim 1 wherein the optical fiber is a single mode fiber.

6. The apparatus of claim 1 wherein the desired pattern is a Lissajous curve trajectory.

7. The apparatus of claim 2 wherein the photodetector is an array of photodetectors, and the diameter of the laser pulse at each photodetector in the array corresponds to the size of the photodetector.

8. The apparatus of claim 1 wherein the actuator includes a position sensor output coupled to the microcontroller.

9. The apparatus of claim 1 wherein the collimation optics comprise a collimating lens integrated with a tip of the optical fiber.

10. The apparatus of claim 1 wherein the actuator is a piezoelectric tube actuator and wherein the program further includes instructions to:
    move the optical fiber at a mechanical resonance frequency of the optical fiber;
    control two amplitude modulating sinusoidal drive signals applied alternatively to the piezoelectric tube actuator wherein each drive signal corresponds to an axis of movement of the optical fiber and the drive signals are applied to each quadrant of the piezoelectric tube actuator.

11. The apparatus of claim 10 wherein the movement of the optical fiber is an expanding spiral, moving from the center outward, and wherein the program further includes instructions to:
    when the optical fiber reaches the outermost ring of the spiral pattern, apply a braking signal to the piezoelectric tube actuator opposite a direction of motion of the fiber to rapidly force the fiber back to the center of the spiral pattern, thereby preparing for the next outward spiral scan;
    apply the braking signal at a frequency a frequency approximately equal to the resonant frequency, with a root displacement in the opposite direction of the motion of the fiber.

12. An apparatus for determining a distance to an object by detecting a reflected light beam, the apparatus comprising:
    a light emitter emitting a light beam;
    an optical fiber mounted to direct the light beam as an output light beam of the optical fiber;
    an actuator, coupled proximate a distal end of the optical fiber, operable to move the optical fiber in a desired pattern;
    collimation optics, mounted to intercept the output light beam of the optical fiber and operable to collimate the output light beam of the optical fiber, wherein the collimating optics are integrated in the tip of the fiber optic, using a curved shape at the tip;
    a photodetector mounted to receive a reflected light beam after reflecting off an object in an external environment; and
    a control system for determining a distance to the object based on an elapsed time between emission of the light beam and a detection of the reflected light beam by the photodetector.

13. The apparatus of claim 12 wherein the light emitter is a laser emitting laser pulses.

14. The apparatus of claim 12 further comprising:
    a microcontroller having a control output coupled to a control input of the actuator; and
    a memory, coupled to the microcontroller, the memory having a non-transitory computer readable media including a program for controlling the actuator to generate the desired pattern for the output light beam.

15. A method comprising:
    emitting a light beam to an optical fiber;
    directing the light beam as an output light beam of the optical fiber;
    moving the optical fiber in a desired pattern;
    causing the output light beam to form a spiral pattern;
    generating optical pulses with the optical light beam, with a position of the optical pulses along the spiral pattern forming a rectangular grid;
    collimating the output light beam of the optical fiber;
    receiving a reflected light beam after reflecting off an object in an external environment; and determining a distance to the object based on an elapsed time between emission of the light beam and a detection of the reflected light beam.

16. The method of claim 15 wherein the desired pattern is a spiral pattern.

17. The method of claim 15 wherein moving the optical fiber comprises controlling a piezoelectric tube actuator coupled to the optical fiber.

18. The method of claim 15 wherein the optical fiber is a single mode fiber.

19. The method of claim 15 wherein the desired pattern is a Lissajous curve trajectory.

20. The method of claim 15 further comprising providing a feedback signal with a position of the optical fiber.

* * * * *